(12) United States Patent
Grimm

(10) Patent No.: US 7,444,241 B2
(45) Date of Patent: Oct. 28, 2008

(54) METHOD FOR DETECTING OR PREDICTING VEHICLE CUT-INS

(75) Inventor: Donald K. Grimm, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 130 days.

(21) Appl. No.: 11/299,276

(22) Filed: Dec. 9, 2005

(65) Prior Publication Data

US 2007/0150196 A1 Jun. 28, 2007

(51) Int. Cl.
*B60Q 1/34* (2006.01)

(52) U.S. Cl. ........................ 701/301; 340/901

(58) Field of Classification Search .............. 701/33, 701/36, 48, 93, 96, 301, 302; 340/425.5, 340/436, 901; 180/167, 170
See application file for complete search history.

(56) References Cited

U.S. PATENT DOCUMENTS

| | | | |
|---|---|---|---|
| 4,786,164 A * | 11/1988 | Kawata | 356/5.05 |
| 5,234,071 A * | 8/1993 | Kajiwara | 180/169 |
| 5,710,565 A * | 1/1998 | Shirai et al. | 342/70 |
| 6,223,117 B1 | 4/2001 | Labuhn et al. | |
| 6,744,380 B2 * | 6/2004 | Imanishi et al. | 340/937 |
| 6,873,911 B2 * | 3/2005 | Nishira et al. | 701/301 |
| 6,894,608 B1 * | 5/2005 | Gunderson | 340/468 |
| 2003/0163240 A1 | 8/2003 | Egami | |
| 2004/0149504 A1 | 8/2004 | Swoboda et al. | |
| 2005/0242931 A1 * | 11/2005 | Gunderson et al. | 340/431 |
| 2005/0273215 A1 * | 12/2005 | Kuge | 701/1 |

FOREIGN PATENT DOCUMENTS

JP 7089367 4/1995

* cited by examiner

*Primary Examiner*—Dalena Tran

(57) ABSTRACT

A system for determining the potential for a possible cut-in situation by a cut-in vehicle on a subject vehicle. The subject vehicle may employ various devices, such as cameras, sensors, wireless communications systems, map data bases, navigational systems, etc., for detecting the cut-in vehicle, the possible movement of the cut-in vehicle, merge signs and other factors. The system can use this information in combination with collision avoidance systems or adaptive cruise control systems to take preventative action in the event of a potential cut-in situation.

17 Claims, 5 Drawing Sheets

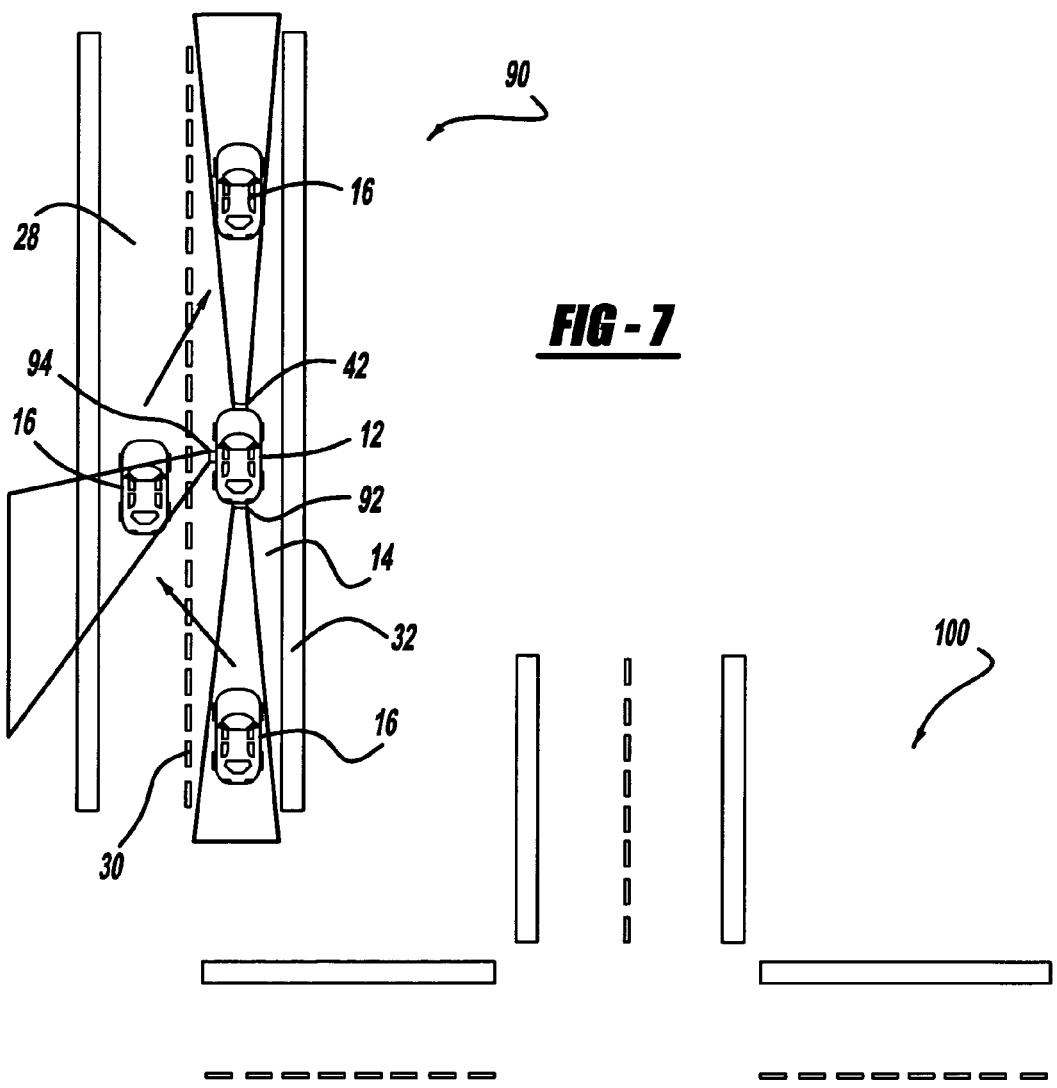
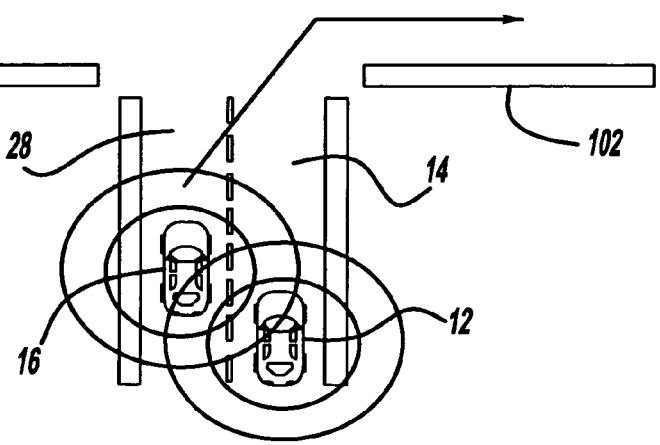

METHOD FOR DETECTING OR PREDICTING VEHICLE CUT-INS

BACKGROUND OF THE INVENTION

1. Field of the Invention

This invention relates generally to a system and method for determining whether another vehicle may cut in front of a subject vehicle and, more particularly, to a system and method for determining whether another vehicle may cut in front of a subject vehicle, where the system and method use sensors and/or cameras for detecting the other vehicle and takes certain preventive steps if the other vehicle is likely to cut-in.

2. Discussion of the Related Art

Collision avoidance systems and/or adaptive cruise control systems are known in the art that provide automatic vehicle control, such as braking, if a potential or imminent collision with another vehicle or object is detected. For example, adaptive cruise control systems are known that employ a forward looking sensor, such as a radar or lidar sensor, that provides automatic speed control and/or braking if the vehicle is approaching another vehicle. Also, collision avoidance systems are known that employ sensors for determining if a collision with an object may be imminent that may provide vehicle braking even if the vehicle operator is controlling the vehicle.

These types of systems typically employ long-range sensors that have a narrow field-of-view in the near-field of the vehicle. Particularly, these sensor signals emanate from a point source on the vehicle and extend in the forward direction of the vehicle, typically to about 150 meters. Thus, these types of systems may suffer a potential disadvantage in that they are unable to quickly and accurately detect a vehicle that may cut in front of the subject vehicle because of the sensors limited near field-of-view.

It would be desirable to be able to early and accurately identify a potential lead vehicle cut-in situation to improve the performance of collision avoidance and adaptive cruise control systems. Early detection of vehicle cut-in may enhance vehicle safety by providing additional and more accurate information to threat assessment algorithms. Further, driver comfort may be improved because large changes in vehicle speed can be reduced as a result of early detection of potential problems, and thus, the driver will be provided with a smoother overall driving experience.

SUMMARY OF THE INVENTION

In accordance with the teachings of the present invention, a number of techniques are disclosed for detecting and assessing a potential vehicle cut-in situation where one vehicle may cut in front of a subject vehicle. In one embodiment of the invention, the subject vehicle employs a forward-looking wide field-of-view camera that detects turn signal activity on forward and adjacent vehicles to detect a potential cut-in situation. In another embodiment of the invention, the subject vehicle uses a camera normally provided for lane tracking for the subject vehicle to determine whether another vehicle may cut-in. In another embodiment of the invention, the subject vehicle employs a vision processing algorithm to detect lane-merging signs to anticipate whether another vehicle may possibly be merging and cutting in front of the subject vehicle. In another embodiment of the invention, the subject vehicle employs a map data base for determining when lane merging signs are coming up, and uses a camera, front mounted short range sensor array or side mounted sensors to determine if another vehicle is in a position to potentially cut in front of the subject vehicle. In another embodiment of the invention, wireless communications are provided between the subject vehicle and other vehicles that exchange information, such as steering angle, vehicle heading, vehicle yaw rate, etc., to determine a potential cut-in situation. In another embodiment of the invention, the subject vehicle uses wireless communications to predict lane obstructions to determine whether a potential cut-in situation exists. In another embodiment of the invention, the subject vehicle uses side and rear object detection sensors to detect a passing vehicle that may ultimately cut-in after the pass. In another embodiment of the invention, the subject vehicle uses wireless communication to read the navigation system of other vehicles to determine whether another vehicle may potentially turn in front of the subject vehicle.

Additional features of the present invention will become apparent from the following description and appended claims taken in conjunction with the accompanying drawings.

BRIEF DESCRIPTION OF THE DRAWING

FIG. 7 is a plan view of a subject vehicle using side and rear detection sensors to detect a passing vehicle for anticipating a potential cut-in situation, according to another embodiment of the present invention;

FIG. 8 is a plan view of a subject vehicle employing a wireless communications system and navigation route information for anticipating the potential for another vehicle cutting in based on the navigation route, according to another embodiment of the present invention.

DETAILED DESCRIPTION OF THE EMBODIMENTS

The following discussion of the embodiments of the invention directed to a system and method for determining a potential vehicle cut-in situation is merely exemplary in nature, and is in no way intended to limit the invention or its applications or uses.

Figure 1:
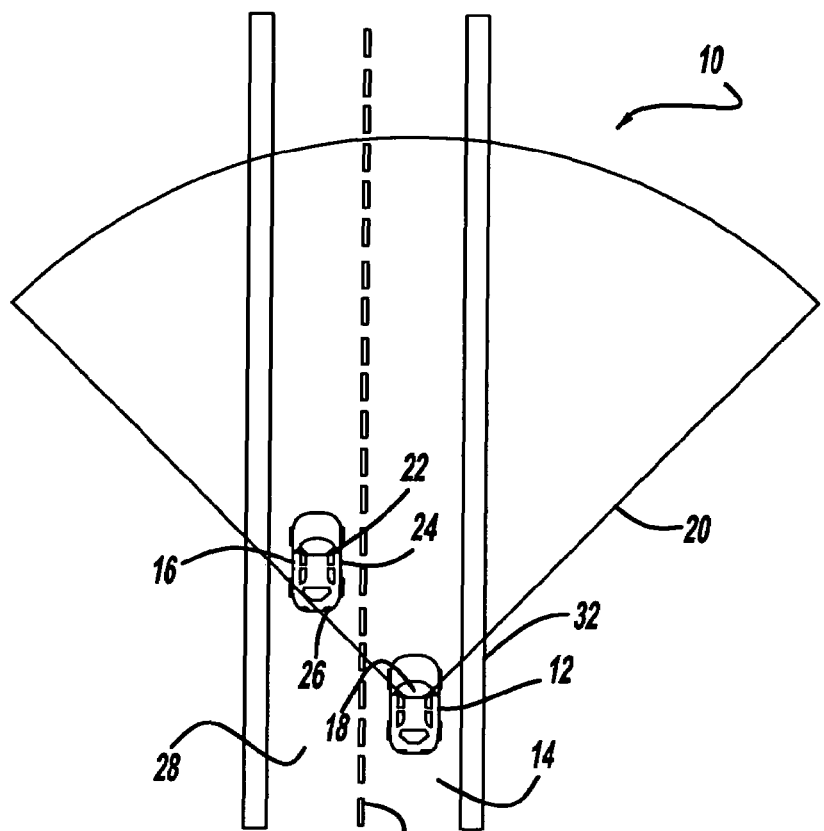
FIG. 1 is a plan view of a subject vehicle using a camera and vision processing to detect another vehicles turn-signals for anticipating a potential cut-in situation, according to an embodiment of the present invention.

FIG. 1 is a plan view of a system 10 used by a subject vehicle 12 traveling down a lane 14 to determine whether another vehicle 16 traveling in an adjacent lane 28 may cut-in front of the subject vehicle 12, according to an embodiment of the present invention. In this embodiment, the subject vehicle 12 includes a forward-looking vision camera 18 that has a relatively wide field-of-view 20, such as 60°, in front of the vehicle 12. The camera 18 can be positioned behind the rear-view mirror, or at some other suitable location. The image generated by the camera 18 is sent to a vision processing system that is looking for turn signal activity on the other vehicle 16. In one embodiment, the vision processing system looks for a flashing turn signal arrow on a side mirror 22 of the vehicle 16. In another embodiment, the vision processing system looks for a flashing side marker turn signal light 24. In another embodiment, the vision processing system looks for a flashing turn signal light 26 on the back of the vehicle 16.

If the vision processing system detects a flashing turn signal light, then it can take suitable steps for anticipating that the vehicle 16 may cut-in front of the vehicle 12. This information can be used in combination with a collision avoidance system or an adaptive cruise control system to take the appropriate steps to prevent a potential collision. The vision processing system can detect the shape, such as an arrow, of a particular turn signal light and/or the flash period of the turn signal light. The camera 18 can be any suitable camera for the purposes described herein, and can be specially provided for the cut-in detection system of the invention. Also, the camera 18 can be part of a lane tracking system, known to those skilled in the art, that monitors a center line 30 and a side line 32 of the lane 14, and provides a signal to the vehicle operator if the vehicle 12 is about to cross the center line 30 or the side line 32. The vision processing system will monitor range information provide by the camera 18 to adjust the following gap between the vehicles 12 and 16 so that in the event the vehicle 16 does perform a cut-in maneuver, minimal braking will be required in order to maintain a safe following gap.

To account for driver preferences, the vehicle operator can select the level of braking authority that is acceptable when a potential cut-in is identified, and the system 10 can be optimized either for responsiveness or driver comfort. For example, if the responsiveness setting is selected, the following gap can be determined by time-to-collision or lead-vehicle deceleration calculations, and the vehicle 12 may need to apply a substantial amount of braking if the cut-in event occurs. If the driver comfort setting is selected, the following gap can be determined based on a desired level of deceleration and the vehicle 12 can reduce it speed when the turn signal is detected leaving a space for the vehicle 16 to merge in front of the vehicle 12.

Figure 2:
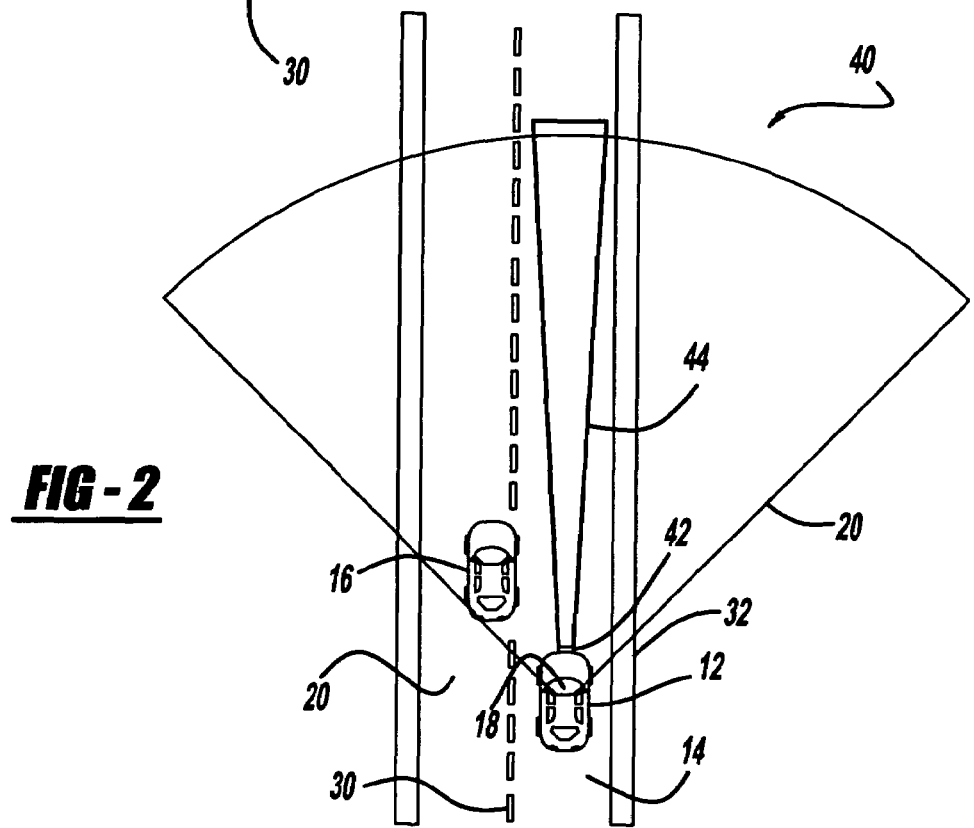
FIG. 2 is a plan view of a subject vehicle using a camera or front mounted short-range sensor array for lane tracking purposes and for determining whether another vehicle is tracking into the lane of the subject vehicle for anticipating a potential cut-in situation, according to another embodiment of the present invention.

FIG. 2 is a plan view of a system 40 for determining a potential vehicle cut-in situation, according to another embodiment of the present invention, where like elements are identified with the same reference numeral. In this embodiment, the camera 18 is being used for lane tracking of the subject vehicle 12, as discussed above. Alternatively, the camera 18 can be replaced with a front mounted short-range sensor array. In addition, the vision processing system determines whether the other vehicle 16 is crossing the center line 30 to provide a signal for a potential cut-in by the vehicle 16. Therefore, the vision processing system can classify forward vehicles as being in the lane 14 or out of the lane 14. If the camera 18 is used in combination with a front long-range sensor 42, such as a radar sensor or a lidar sensor, having a field-of-view 44 in a collision avoidance system, fusion of targets can be accomplished by merging targets that are common between the long-range sensor 42 and the camera 18. Also, fusion between a short-range sensor array, a long-range sensor and the camera 18 can be used. Therefore, the vision processing system will have the advance notice of a cut-in situation by the vehicle 16 and can perform the necessary speed adjustments earlier with a smoother response.

Figure 3:
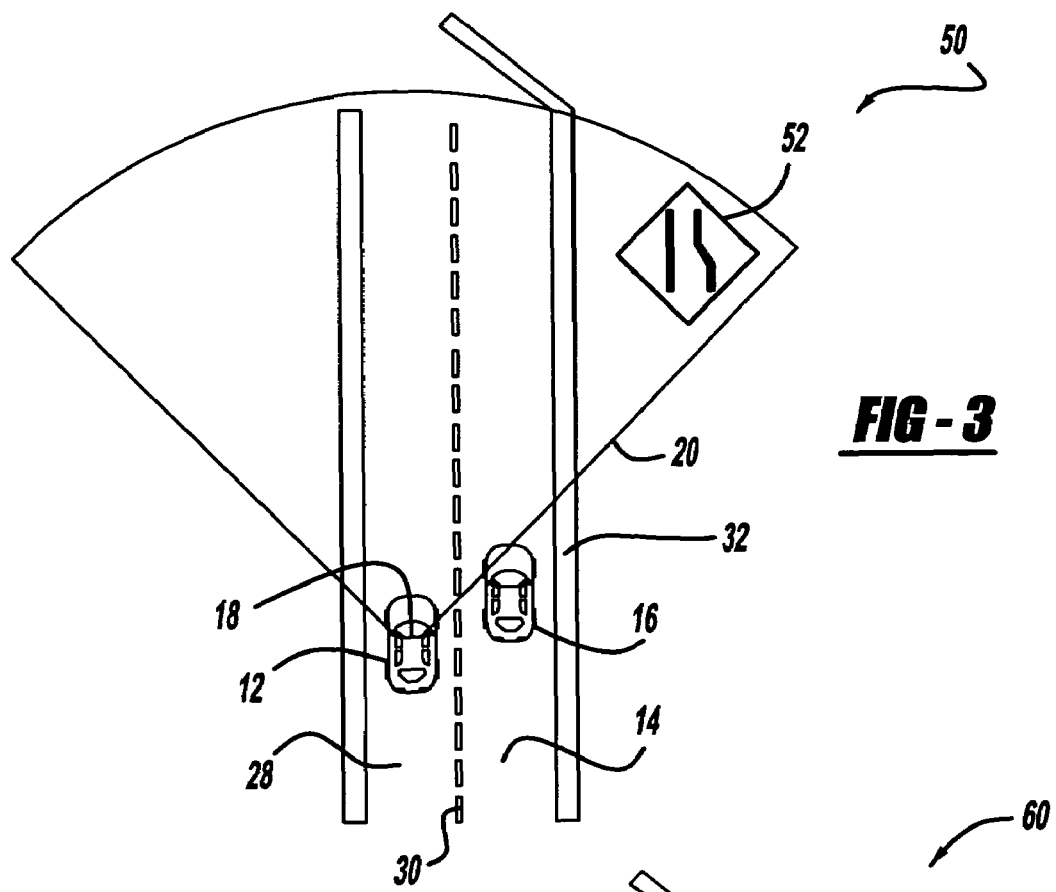
FIG. 3 is a plan view of a subject vehicle using a camera and vision processing for detecting merge signs for anticipating a potential cut-in situation, according to another embodiment of the present invention.

FIG. 3 is a plan view of a system 50 for determining a potential vehicle cut-in situation, according to another embodiment of the present invention. The subject vehicle 12 is traveling down the lane 28 and the other vehicle 16 is traveling down the lane 14 where the lane 14 will be merging into the lane 20 in front of the vehicles 12 and 16. In this embodiment, the system 50 includes a vision system, such as the camera 18, to detect the shape of a merge sign 52 indicating the merge, and detect the vehicle 16 in the merge lane 14 so that it can be prepared for a potential cut-in situation. Various signs may be known in the art for indicating an up-coming merge and the vision processing system in the vehicle 12 can be designed to detect the shape of all of these signs. In this embodiment, the system 50 only predicts the potential cut-in situation that can be fused with other vehicle sensors to make a determination as to how much, if any, the speed of the vehicle 12 needs to be changed. For example, if the camera 18 identifies the merge sign 52 and a vehicle detection system reports that the vehicle 16 is traveling along side of the vehicle 12 in the lane 14, the speed of the vehicle 12 can be varied, either up or down, using driver set preferences in order allow a safe merge ahead. Distance information to the sign 52 and range rate information from a side object sensor or a front mounted short-range sensor array can be used to determine the amount of speed change that may be required in order to achieve a safe merge. For example, if the distance to the merge sign 52 is very short and the vehicle 16 is along side of the vehicle 12, a substantial amount of braking may be required in order to allow a safe lane change maneuver.

Figure 4:
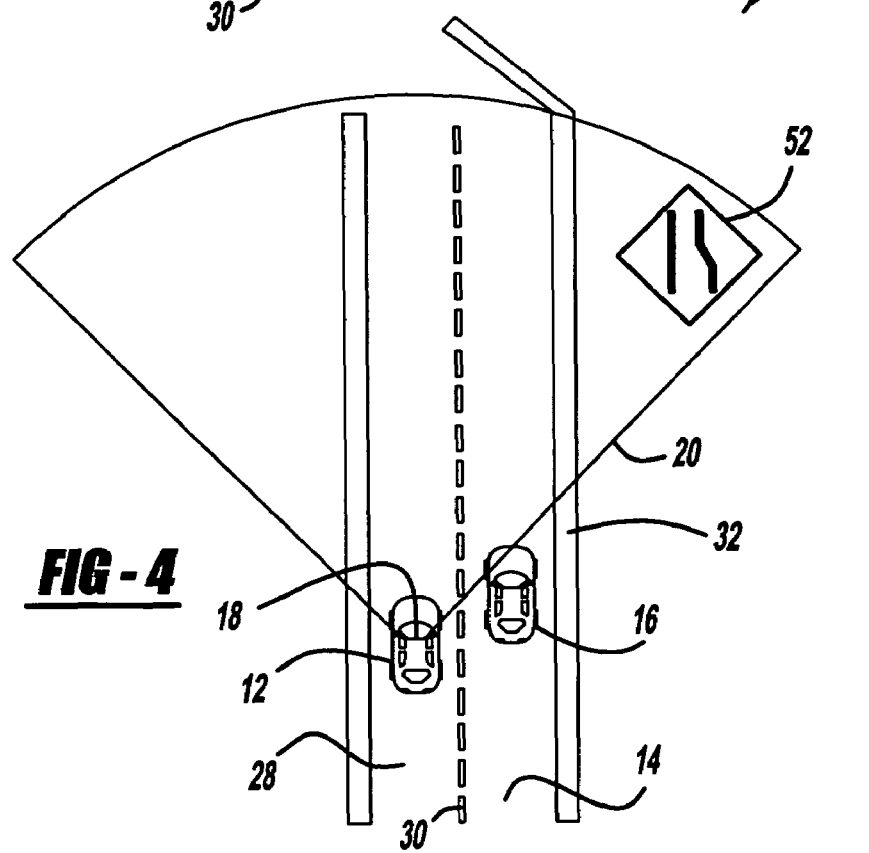
FIG. 4 is a plan view of a subject vehicle using a map data base to determine the location of merge signs for anticipating a potential cut-in situation, according to another embodiment of the present invention.

FIG. 4 is a plan view of a system 60 similar to the system 50, according to another embodiment of the present invention. In this embodiment, the vehicle 12 includes a navigation system, well known to those skilled in the art, that employs a map data base of the road that the subject vehicle 12 is traveling on and a GPS receiver that receives GPS signals from a GPS satellite to give the position, i.e., latitude, longitude and heading, of the vehicle 12. In this embodiment, the lane ending or merge sign 52 is programmed into the map data base so that the vehicle 12 knows when it is approaching one of the signs. By using this information in combination with detection of the other vehicle 16, using the camera 18, side sensors, or front mounted short-range sensor arrays, the collision avoidance system can take the appropriate action as discussed above.

Figure 5:
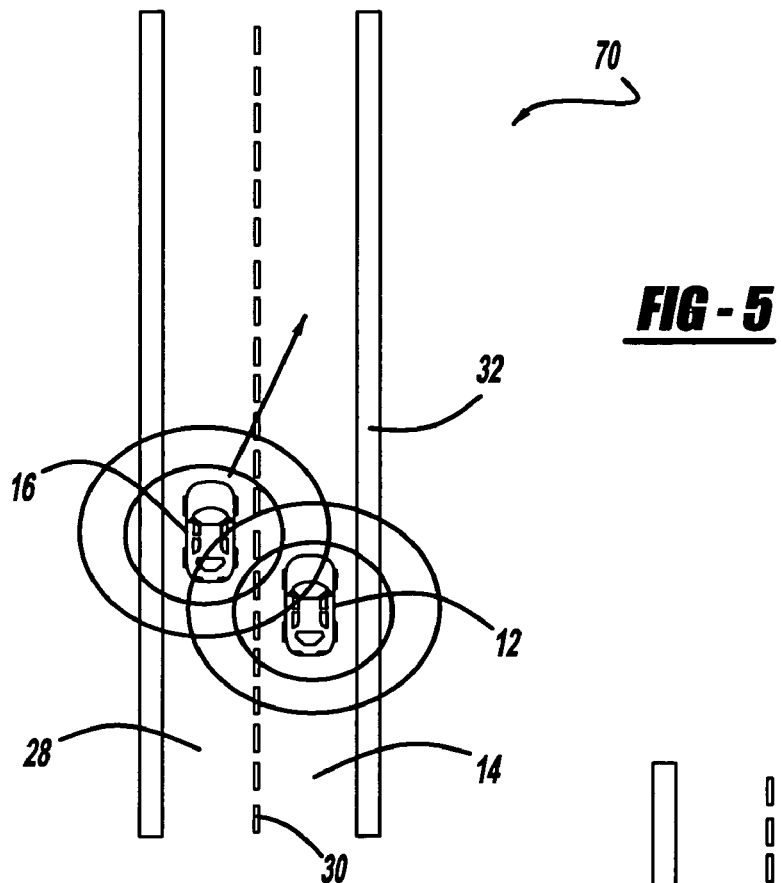
FIG. 5 is a plan view of a subject vehicle using wireless communications with another vehicle to determine various vehicle parameters for anticipating a potential cut-in situation, according to another embodiment of the present invention.

FIG. 5 is a plan view of a system 70 for determining a potential vehicle cut-in situation using wireless communications systems, according to another embodiment of the present invention. It is known in the art that certain vehicle systems, such as stability control systems, sense certain vehicle parameters, such as yaw rate, steering angle, lateral acceleration, vehicle speed, etc. It has also been proposed in the art that vehicles some day will be able to communicate wireless with each other to exchange this and other information for future collision avoidance systems or other things. In this embodiment, the invention proposes using this information to anticipate whether the vehicle 16 is going to cut in front of the vehicle 12. Particularly, the vehicle 12 receives the various parameters of the operation of the vehicle 16, and can use this information to determine whether the vehicle 16 is moving from the lane 28 to the lane 14. In those situations where it is determined that the vehicle 16 may cross into the lane 14, an automated speed control of the vehicle 12 can be adjusted accordingly.

Figure 6:
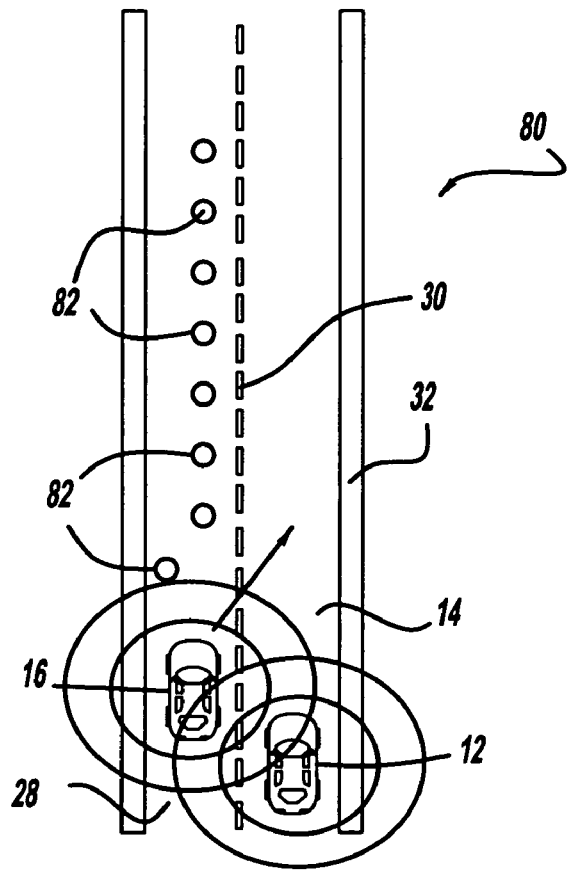
FIG. 6 is a plan view of a subject vehicle using wireless communications to determine whether another vehicle may be changing lanes for anticipating a potential cut-in situation, according to another embodiment of the present invention.

FIG. 6 is a plan view of a system 80 for determining a potential vehicle cut-in situation, according to another embodiment of the present invention. In this embodiment, the vehicle 12 determines that the vehicle 16 may cut into the lane 14 ahead of the vehicle 12 based on the activity of other vehicles ahead of the vehicles 12 and 16. For example, the lane 28 may be blocked with construction barrels 82 or some other obstruction. The vehicle 12 may wirelessly receive information from other vehicles traveling in the lane 28 that have merged into the lane 14 ahead of the vehicle 12. The vehicle 12 can then use this information to infer that the vehicle 16 may also move into the lane 14 in the near future to anticipate a potential cut-in situation. Also, the vehicle 12 can use map information to determine that the road is a two lane road, but no vehicles are using the lane 28 ahead, and also infer from this information that there is some type of obstruction of the lane 28 ahead. Particularly, a count could be maintained that is tracked by the vehicle 12 of the number of vehicle lane transitions for a particular area. If the count exceeded a certain threshold, the area would be classified as a lane transition area, and be communicated to other vehicles that pass through this region. This information could remain valid as long as there were sufficient vehicles traveling in the area.

FIG. 7 is a plan view of a system 90 for determining a potential vehicle cut-in situation, according to another embodiment of the present invention. In this embodiment, the subject vehicle 12 includes the front sensor 42, a rear sensor 92 and a side sensor 94. Another side sensor would typically be provided on the other side of the vehicle 12. If the other vehicle 16 is traveling in the lane 14 and is approaching the vehicle 12 at a relatively high rate of speed, the rear and side sensors 92 and 94 can provide a signal indicating that the vehicle 16 is passing the vehicle 12 in the lane 28. If the system 90 provides this detection, then the system 90 can also prepare for a possible cut-in maneuver where the vehicle 16 would cut in front of the vehicle 12 after the passing maneuver. The information provided by the rear sensor 92 and the side sensor 94 may be used for a side blind zone or lane changing detection system, and can be used by a front collision avoidance or adaptive cruise control system as supplemental target information because these targets are normally outside the detection range of the sensor 42. If the lanes 14 and 28 are opposite traveling lanes, as determined from the camera 18 or the map data base, then the system 90 will have a higher degree of probability that the vehicle 16 may cut-in.

FIG. 8 is a plan view of a system 100 for determining a potential cut-in situation, according to another embodiment of the present invention. In this embodiment, the subject vehicle 12 and the other vehicle 16 both have wireless communication systems of the type discussed above. Further, both the vehicle 12 and 16 have navigation systems with map data bases. The vehicle 16 would be transmitting its route information wireless that could be received by the vehicle 12. In this depiction, the vehicle 12 is traveling in the right side lane 14 and the vehicle 16 is traveling in the left side lane 28. If the navigation system of the vehicle 16 indicates that the vehicle 16 needs to turn at an upcoming road 102, and the road is fairly close, the vehicle 12 may want to take certain anticipatory or preventative measures because there may be a high degree of probability that the vehicle 16 will cut in front of the vehicle 12 to make the right hand turn.

Figure 9:
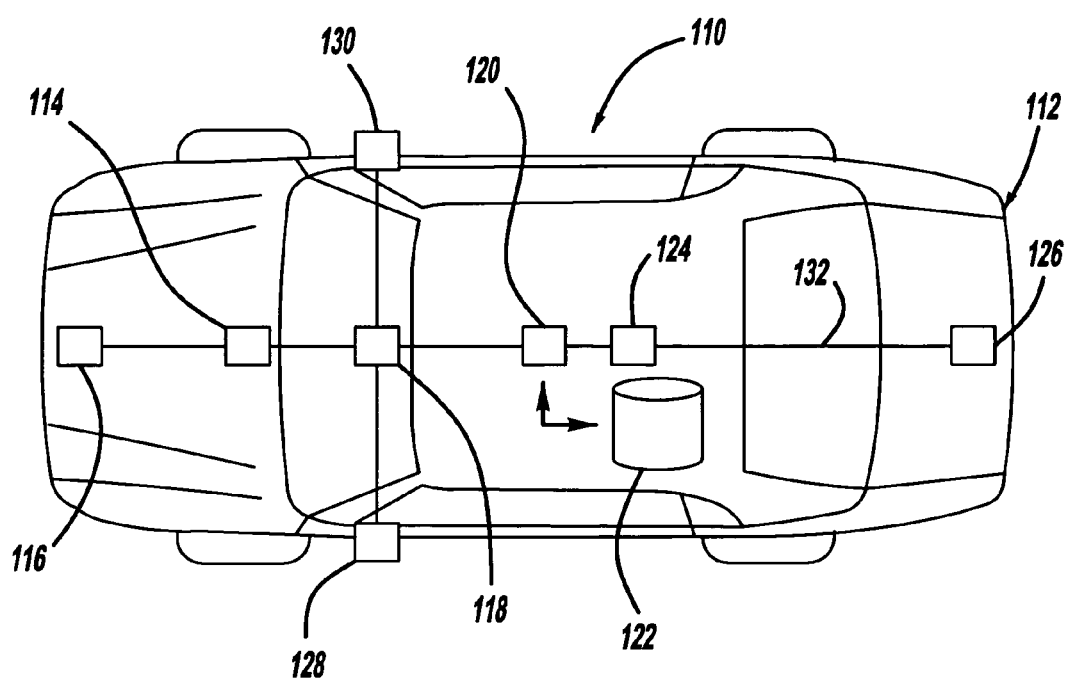
FIG. 9 is a plan view of a vehicle including the components for using the various cut-in detection techniques of the invention.

FIG. 9 is a diagram of a system 110 on a vehicle 112 that includes the various cameras and sensors discussed above for a cut-in detection system of the invention. The system 110 includes a cut-in detection module 114 that includes the vision processing system referred to above. The module 114 could be part of a collision avoidance system, adaptive cruise control system, lane changing system, etc. One of ordinary skill in the art would recognize how to include the information discussed above in these types of systems to anticipate and/or take preventative maneuvers in the event of a cut-in situation. The system 110 includes a long-range forward sensor 116, such as a radar sensor or a lidar sensor, representing the sensor 42, positioned at the front of the vehicle 112. Further, the system 110 includes a forward looking camera 118, representing the camera 18, that is also positioned at the front of the vehicle 112. The system 110 further includes a GPS receiver 120 and a map data base 122 in combination therewith. The GPS receiver 120 processes the vehicle position information. The system 10 also includes a wireless antenna chip set receiver 124 that processes information received through wireless communications with other vehicles. The system 110 further includes side object sensors 128 and 130 that represent the sensor 94 and a rear object sensor 126 at the rear of the vehicle 112, representing the rear sensor 92. All of the various sensors and cameras referred to herein are in communication with the module 114 on a communications bus 132.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for determining a potential cut-in situation of a subject vehicle by a cut-in vehicle, said system comprising:
    a camera mounted to a forward portion of the subject vehicle, said camera having a field-of-view for detecting turn signal activity on the cut-in vehicle when the cut-in vehicle is adjacent to and/or forward of the subject vehicle; and
    a processor responsive to a signal from the camera indicative of the turn signal activity, said processor determining a potential cut-in situation and taking a predetermined action to help avoid a possible collision between the subject vehicle and the cut-in vehicle if the cut-in vehicle does cut in front of the subject vehicle.

2. The system according to claim 1 wherein the camera detects the turn signal activity selected from the group consisting of a turn signal on a side mirror of the cut-in vehicle, a side marker turn signal on the cut-in vehicle and a rear turn signal on the cut-in vehicle.

3. The system according to claim 1 wherein the camera detects the shape of a flashing arrow on a side mirror of the cut-in vehicle.

4. The system according to claim 1 wherein the camera detects the flash period of the turn signal on the cut-in vehicle.

5. The system according to claim 1 wherein the field-of-view of the camera is about 60°.

6. The system according to claim 1 wherein the system is part of an adaptive cruise control system.

7. A system for determining a potential cut-in situation of a subject vehicle by a cut-in vehicle, said system comprising:
    a detector mounted to a forward portion of the subject vehicle, said detector having a field-of-view for detecting whether the cut-in vehicle is crossing a center line when the cut-in vehicle is adjacent to and/or forward of the subject vehicle;

a processor responsive to a signal from the detector indicative of the center line cross-over, said processor determining a potential cut-in situation and taking a predetermined action to help avoid a possible collision between the subject vehicle and the cut-in vehicle if the cut-in vehicle does cut in front of the subject vehicle and a sensor mounted to a forward portion of the subject vehicle, said sensor detecting vehicles in front of the subject vehicle said processor providing sensor fusion and merging in of the same vehicles detected by the sensor and the detector.

8. The system according to claim 7 wherein the field-of-view of the detector is about 60°.

9. The system according to claim 7 wherein the detector is a camera.

10. The system according to claim 7 wherein the detector is a front mounted short-range sensor array.

11. The system according to claim 7 wherein the detector is a front mounted long-range sensor array.

12. The system according to claim 7 wherein the system is part of an adaptive cruise control system.

13. A system for determining a potential cut-in situation of a subject vehicle by a cut-in vehicle, said system comprising:

at least one detection device for detecting the cut-in vehicle when the cut-in vehicle is adjacent to and/or forward of the subject vehicle, wherein the at least one detection device also detects lane ending signs or merge signs; and a processor responsive to a signal from the at least one detection device indicative of the location of the cut-in vehicle and the signs, said processor determining a potential cut-in situation and taking a predetermine action to help avoid a possible collision between the subject vehicle and the cut-in vehicle if the cut-in vehicle does cut in front of the subject vehicle.

14. The system according to claim 13 wherein the at least one detection device is selected from one or more of the group consisting of forward looking radar sensors, side looking radar sensors, rear looking radar sensors, forward looking cameras, forward looking lidar sensors, side looking lidar sensors, rear looking lidar sensors, GPS receivers, wireless communications systems and navigation systems.

15. The system according to claim 13 wherein the system is part of a collision avoidance system or an adaptive cruise control system.

16. The system according to claim 13 further comprising a map data base that stores the location of lane ending or merge signs.

17. The system according to claim 13 wherein the at least one detection device includes a camera having a field-of-view of about 60°.

* * * * *